No. 790,888. PATENTED MAY 30, 1905.
W. FERRIS.
FLUID METER.
APPLICATION FILED MAR. 18, 1901.
2 SHEETS—SHEET 1.
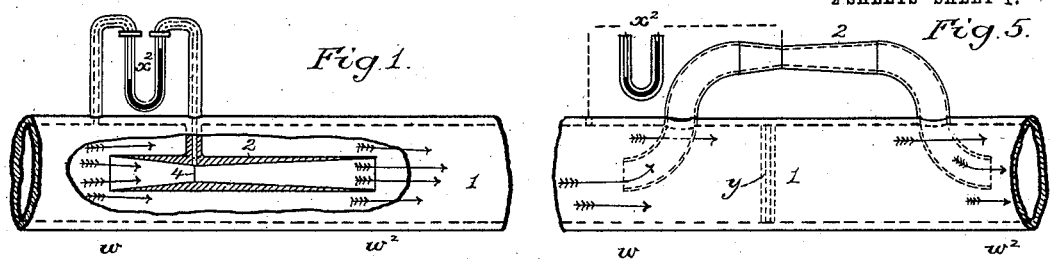
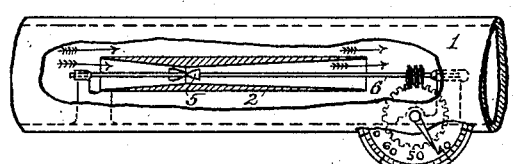
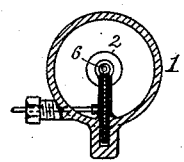
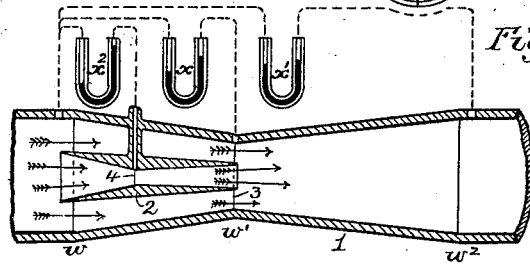
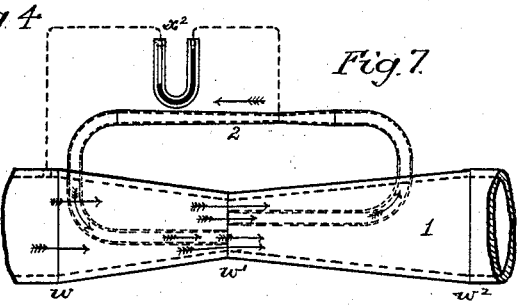
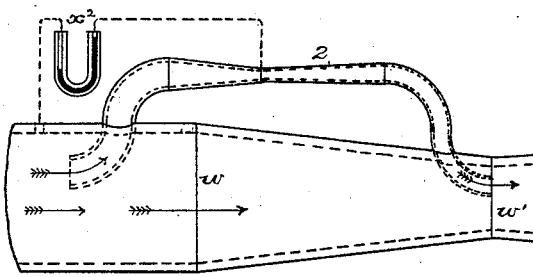
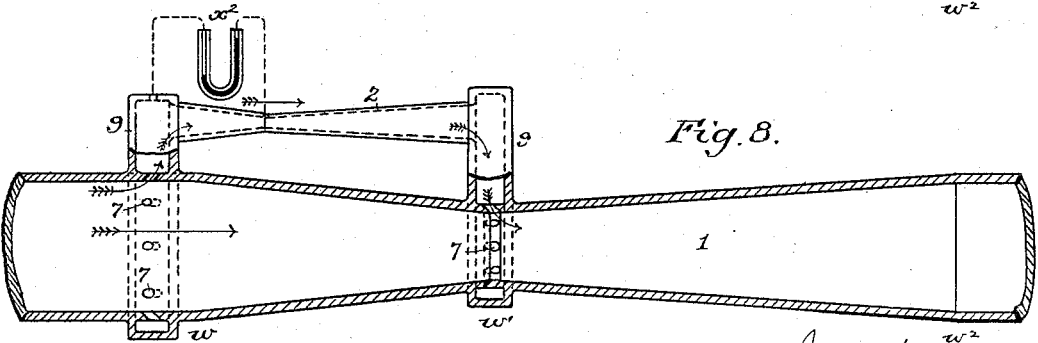
Witnesses
Frank T. A. Graham
Herman E. Metius
Inventor
Walter Ferris
by his Attorneys
Howson & Howson

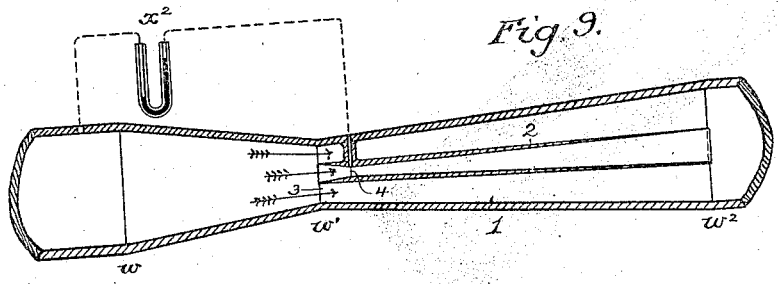
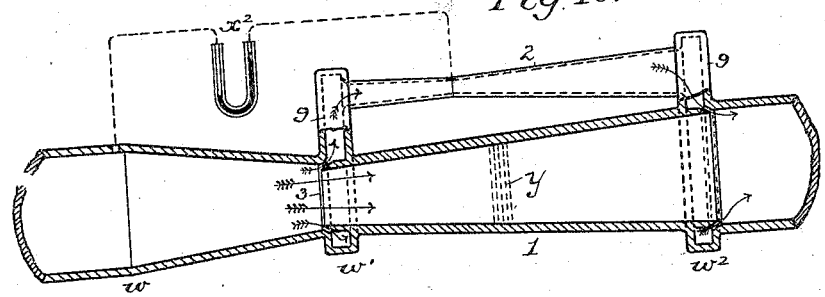
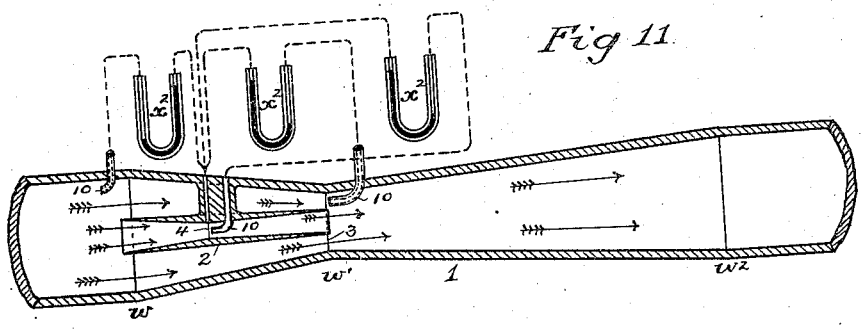
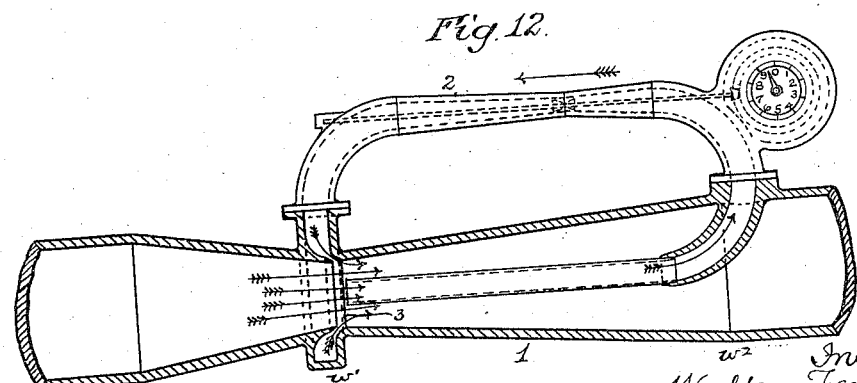

No. 790,888.

Patented May 30, 1905.

UNITED STATES PATENT OFFICE.

WALTER FERRIS, OF PHILADELPHIA, PENNSYLVANIA.

FLUID-METER.

SPECIFICATION forming part of Letters Patent No. 790,888, dated May 30, 1905.

Application filed March 18, 1901. Serial No. 51,650.

*To all whom it may concern:*

Be it known that I, WALTER FERRIS, a citizen of the United States, residing in Philadelphia, Pennsylvania, have invented certain Improvements in Fluid-Meters, of which the following is a specification.

The object of my invention is to so construct a fluid-meter as to register with accuracy fluid passing through the meter-tube at a lower velocity than the minimum rate at which with the present types of meters the flow can be registered with any approach to accuracy.

My invention consists in part in the application of a secondary passage or shunt-tube to a conduit conveying a fluid in condition of full flow, said secondary passage being so connected with the main conduit that a portion of the fluid will pass through the secondary passage in accordance with well-known hydraulic laws. The secondary passage is formed with a constricted portion or throat in such manner that the velocity of the fluid passing through this throat must exceed the velocity of flow in the main tube at either the entrance to or exit from the secondary passage.

My invention further consists in certain conformations of the main conduit and secondary passage and in certain arrangements of said secondary passage in respect to the main conduit in order to obtain the desired high velocity through the throat in the secondary passage with the least possible frictional loss; and it also consists in methods of applying measuring devices to the throat in the secondary passage and to some other point in the apparatus or to the throat only in some cases in such manner as to obtain an accurate measurement of the total amount of fluid passing through the main conduit.

For convenience I will hereinafter term the secondary passage the "shunt-tube" and its throat the "shunt-throat" and will designate the main passage or conduit the "main tube" and where it also has a constriction will call the latter the "main throat."

The forces tending to induce the flow through the shunt-tube are higher statical pressure in the main tube at the entrance to said shunt-tube than at the exit and kinetic energy stored in the flowing fluid as it enters the mouth of the shunt-tube or in cases where the static pressure at the exit of the shunt-tube is greater than at its entrance such kinetic energy of the entering fluid as will be sufficient to overcome such excess of static pressure.

In the accompanying drawings, Figure 1 is a side elevation, partly broken away and illustrating a shunt-tube and mercury-gage applied to a main tube of uniform diameter in accordance with my invention. Fig. 2 is a similar view, but illustrating the direct application of a mechanical measuring apparatus to the shunt-tube. Fig. 3 is a transverse section of Fig. 2. Fig. 4 is a sectional view illustrating the application of the shunt-tube to a Venturi tube and also showing a series of gages for indicating pressures at different points in the main and shunt tubes. Fig. 5 is a view showing the arrangement of the shunt-tube on the outside of a main tube such as shown in Fig. 1. Fig. 6 is a view showing the application of the outside shunt-tube to a Venturi tube. Fig. 7 is a view illustrating the shunt-tube disposed so as to cause flow through the same in a direction the reverse of its flow through the main tube. Fig. 8 is a view illustrating a different means of communication between the outside shunt-tube and the main tube than those before shown. Figs. 9 and 10 are views showing shunt-tubes communicating with Venturi tubes in a manner the reverse of those shown in the other figures. Fig. 11 is a sectional view of a Venturi tube with shunt-tube and series of gages similar to those shown in Fig. 4, but with Pitot-tube connections; and Fig. 12 is a sectional view of a Venturi tube, showing special forms of feed and discharge for the shunt-tube.

It is a well-known fact that the pressure of the contained fluid against the walls of a conduit diminishes as the velocity of flow of the fluid through said conduit increases and, conversely, such decrease of static pressure being due to its conversion into kinetic energy stored in the more rapidly moving fluid, and if the velocity be again diminished to its original value the static pressure will reappear less the amount required to perform the work represented by frictional resistance between the particles of the fluid and between the fluid and the walls of the conduit. Hence in a conduit gradually decreased in area from $w$ to $w'$, Fig. 4, and thence gradually increased to its original area at $w^2$ there will be during the flow a fall of pressure at $w'$, represented by the difference in the height of the mercury columns in the gage $x$, and a lesser fall of pressure at $w^2$, represented by the difference in the height of the mercury columns in the gage $x'$. Both of these pressure differences are found by experiment to be within certain limits nearly proportional to the square of the velocities existing at the given cross-sections during various rates of flow, and in a well-designed tube with water as the fluid the "lost head" represented by the gage $x'$ is about one-sixth of the head represented by the gage $x$. This form of tube, called the "Venturi" tube, is already used as a water-meter, the means of discovering the existing velocity within the tube being the difference of pressure represented by the gage $x$; but the usefulness of this form of meter, as well as of the "Pitot" tube form of meter, described in my application Serial No. 722,082, is limited, on the one hand, by the very slight difference of pressure acting on the differential gage when the velocity of flow through the meter is small, and, on the other hand, by the excessive lost head when the velocity becomes too great. Hence it has been found in practice that the limits of velocity through such meters range from about three feet to about forty feet per second.

Below three feet per second the measurement becomes inaccurate, as the pressure to be measured at this rate of flow only represents about one one-hundredth of one foot of mercury in ordinary cases, while if the velocity exceeds forty feet per second the lost head is no longer proportional to the square of velocity, but rises much more rapidly until it becomes almost impossible to get more water through the meter; hence the desirability of a device which will increase the head $x$ without materially increasing the lost head $x'$. To accomplish this, I employ the shunt-tube already mentioned, which diverts a small quantity of the fluid from the main tube, temporarily raises it to a higher velocity than is attained in said main tube, and then returns it to the latter. As this higher velocity is given only to a fraction of the total current, the excess of lost head in this fraction is scarcely felt when distributed throughout the larger mass of fluid passing through the main tube, and as the high velocity of the shunt-current is proportional to the lower velocity in the main tube throughout the range of the meter any velocity existing in the main throat or tube can be ascertained by reading the gage operating in connection with the shunt-throat, for if the apparatus is first tested to find the head represented by said gage for any known velocity the velocity for any other observed head can be readily calculated.

An examination of Fig. 4, with the comparative heads of the three differential gages, will give a clear idea of the principles on which the action of the shunt-tube depends. In this case we have a Venturi tube 1, containing a shunt-tube 2, with its receiving end or mouth in a portion of the tube having full area and its delivery end at or about the constricted throat 3 of the Venturi tube, this shunt-tube likewise having a constricted throat 4, which is in communication with one leg of a gage $x^2$, the other leg of said gage being in communication with a full-area portion of the Venturi tube.

Considering the main tube alone, it appears that the velocity may be temporarily raised until it shows the Venturi head represented by gage $x$ and then lowered again to its original value with a loss of only the lost head represented by gage $x'$, which, as already stated, is approximately one-sixth of the Venturi head.

With the shunt-tube located as shown the Venturi head of the main tube becomes the lost head of the shunt-tube—that is to say, the difference of pressure between the two ends of the shunt-tube is about six times the difference between the pressures in the portions $w$ and $w^2$ of the main tube. Hence if the frictional resistance in the two tubes is the same the shunt-head represented at $x^2$ will be six times its lost head, (which is the Venturi head $x$,) just as the Venturi head is about six times its own lost head, and hence the shunt-throat should be proportioned to give a velocity equal to the square root of six times the velocity in the main throat—that is to say, about two and forty-five one-hundredths times such main-throat velocity. In practice, however, this full theoretical increase in shunt-throat velocity may not be attained; but no difficulty will be experienced in obtaining such a considerable fractional part of the theoretical increase as will make the shunt-head represented at $x^2$ at least three times the corresponding Venturi head represented at $x$.

When the shunt-tube is placed, as shown in Fig. 4, with its ends in different-sized sections of the main tube, I make the cross-sectional area of the ends of the shunt-tube proportionate to the corresponding sectional areas of the main tube, and while I prefer always to locate the shunt-tube in the main tube and to dispose its delivery end at the contracted throat of such main tube this construction and arrangement is not essential to the main embodiment of my invention. For instance, in Figs. 1, 2, and 5 I have shown the shunt-tube combined with a main tube of uniform area throughout, the flow in the shunt-tube in these cases being due to the kinetic energy of the fluid, slightly assisted by the fall of pressure in the main tube due to frictional resistance between the points $w$ and $w^2$, which friction may be increased to any desired extent by interposing obstacles—such as perforated plates $y$, Fig. 5, or the like—in the main tube between the points $w$ and $w^2$. I prefer, however, to adopt the simpler and more desirable hydraulic expedients which I have shown, these being designed with reference to the prime consideration in this class of work—namely, the production of an accurate meter which will cause the least possible resistance to the flow through it.

The shunt-tube may also, if desired, extend to the outside of the main tube, as shown in Figs. 5, 6, 7, 8, 10, and 12, and various forms of devices for measuring the head at the shunt-throat may be adopted—such, for instance, as the mercury-gage shown in most of the figures of the drawings—or I may adopt means for effecting direct mechanical measurement—as, for instance, a helical wheel 5 or other rotating device located in the shunt-throat and carried by a shaft 6, connected by appropriate gearing to any suitably-located register—as, for instance, in Figs. 2 and 12.

In that form of meter shown in Fig. 7 the flow through the shunt-tube is the reverse of the flow through the main tube and is caused almost entirely by the kinetic energy of the entering water, slightly aided by suction at the exit, due to the flow of the main current.

Fig. 8 shows a form of my improved meter in which the shunt-flow is caused almost entirely by the fall of pressure at the main throat, being slightly assisted by the inclination of the openings 7, through which the main tube communicates with pressure-chambers 9 at the opposite ends of the external shunt-tube 2, and, further, by the frictional loss in the main tube between these two chambers.

In that form of my improved meter shown in Figs. 9 and 10 the shunt-flow is caused mainly by kinetic energy in the entering water, assisted by the frictional losses in the main tube between the entrance to and exit from the shunt. In these meters the static pressure is greater at the exit than at the entrance to the shunt, and this excess operates against the shunt-flow. Hence a rapid flow through such shunt could only be obtained by placing excessive frictional resistance, such as the obstruction $y$, Fig. 10, in the main passage. Therefore while I have shown these two forms of meter as embodying the main principle of my invention they have not the same effectiveness as the other forms of meter shown, whose use is therefore to be preferred. The meter shown in Fig. 10 also illustrates annular forms of entrance to and exit from the shunt, which in their hydraulic effect are similar to the ordinary nozzles, such as are shown in Fig. 5, and this form of entrance and exit for the shunt may be preferred in certain cases for reasons of construction, such as lesser possibility of clogging, &c. Hence they may be used in most of the other forms of meter in which an external shunt-tube is employed.

Fig. 11 shows three different methods of attaching a Pitot tube and a static-pressure tube to the meter, all giving the same head on the differential gages, neglecting the element of friction. This is due to the fact already noted that the sum of the static and kinetic pressures remains constant, neglecting friction, through all velocity changes.

In those forms of my improved meter shown in Figs. 7 and 12 the shunt-tube both receives the shunt-current from and returns it to the same cross-section in the main throat, the force impelling the shunt-current being the same substantially as in the constructions shown in Figs. 4 and 6, supposing that there are the same velocities through the main throat.

In all cases the force tending to drive the water into the mouth of the shunt-tube comprises two elements—the static pressure and the kinetic energy in the fluid—and, as is well known, the sum of these forces at any section of a conduit is equal to their sum at any succeeding section less the loss caused by friction between the two sections, and experiment has shown that the loss by friction in a converging ajutage—as, for instance, the part between $w$ and $w'$ in Fig. 4 is very small. Hence if it is desirable for any reason the entrance to the shunt may be placed at the main throat if the exit be also retained at the same place.

Having thus described my invention, I claim and desire to secure by Letters Patent—

1. The combination, in a fluid-meter, of a main tube with a shunt-tube of the Venturi type of less area than the main tube, and through which the fluid flows with greater velocity than that of the flow through the main tube, and means, acted upon by the fluid at the contracted throat of the shunt-tube, for measuring the velocity of the fluid at said contracted throat, substantially as specified.

2. The combination in a fluid-meter, of a main tube, a shunt-tube of the Venturi type located wholly within said main tube, and means for measuring the velocity of the fluid flowing through the contracted throat of said shunt-tube, substantially as specified.

3. The combination, in a fluid-meter, of a main tube of the Venturi type, a shunt-tube also of the Venturi type, such shunt-tube being of less area than the main tube and through which the fluid flows with greater velocity than that of the flow through the main tube, and means, acted upon by the fluid at the contracted throat of the shunt-tube, for measuring the velocity of the fluid at said contracted throat, substantially as specified.

4. The combination in a fluid-meter, of a main tube of the Venturi type having a contracted throat, a shunt-tube also of the Venturi type and disposed so as to deliver at the contracted throat of the main Venturi tube, and devices for measuring the velocity of the fluid flowing through said shunt-tube, substantially as specified.

5. The combination in a fluid-meter, of a main tube of the Venturi type having a contracted throat, a shunt-tube located inside of said main tube and likewise having a contracted throat, and means for measuring the velocity of the fluid flowing through said shunt-throat, substantially as specified.

6. The combination in a fluid-meter, of a main tube of the Venturi type having a contracted throat, a shunt-tube located inside of said main tube, and also having a contracted throat, said shunt-tube delivering at the contracted throat of the Venturi tube, and means for measuring the velocity of the fluid flowing through said shunt-throat, substantially as specified.

7. The combination, in a fluid-meter, of a main tube, a shunt-tube of the Venturi type, of less area than the main tube and through which the fluid flows with greater velocity than that of the flow through the main tube, and gage-tubes for measuring the velocity of the fluid flowing through the shunt-tube, one of said gage-tubes communicating with the fluid at the contracted throat of said shunt-tube, and the other communicating with the fluid at some other point in its flow, substantially as specified.

8. The combination in a fluid-meter, of a main tube, a shunt-tube of the Venturi type located wholly within said main tube, and gage-tubes for measuring the velocity of the fluid flowing through said shunt-tube, substantially as specified.

9. The combination, in a fluid-meter, of a main tube of the Venturi type, a shunt-tube also of the Venturi type, said shunt-tube being of less area than the main tube and through which the fluid flows with greater velocity than that of the flow through the main tube, and gage-tubes for measuring the velocity of the fluid passing through the contracted throat of said shunt-tube, substantially as specified.

10. The combination in a fluid-meter, of a main tube of the Venturi type having a contracted throat, a shunt-tube also having a contracted throat and disposed so as to deliver at the contracted throat of the Venturi tube, and gage-tubes for measuring the velocity of the fluid flowing through said shunt-throat, substantially as specified.

11. The combination in a fluid-meter, of a main tube of the Venturi type having a contracted throat, a shunt-tube located inside of said main tube and likewise having a contracted throat, and gage-tubes for measuring the velocity of the fluid flowing through said shunt-throat, substantially as specified.

12. The combination in a fluid-meter, of a main tube of the Venturi type having a contracted throat, a shunt-tube located inside of said main tube, and also having a contracted throat, said shunt-tube delivering at the contracted throat of the Venturi tube, and gage-tubes for measuring the velocity of the fluid flowing through said shunt-throat, substantially as specified.

13. The combination in a fluid-meter, of a main tube, with a shunt-tube of the Venturi type, and gage-tubes communicating in different directions with the flowing fluid for measuring the velocity of the fluid flowing through the contracted throat of said shunt-tube, one of said gage-tubes communicating with the fluid at the contracted throat of the said shunt-tube, substantially as specified.

14. The combination in a fluid-meter, of a main tube, a shunt-tube located within said main tube and having a contracted throat, and gage-tubes communicating in different directions with the flowing fluid for measuring the velocity of the fluid flowing through said shunt-throat, substantially as specified.

15. The combination in a fluid-meter, of a main tube of the Venturi type having a contracted throat, a shunt-tube also having a contracted throat, and gage-tubes communicating in different directions with the flowing fluid for measuring the velocity of the fluid flowing through said shunt-throat, substantially as specified.

16. The combination in a fluid-meter, of a main tube of the Venturi type having a contracted throat, a shunt-tube also having a contracted throat and disposed so as to deliver at the contracted throat of the Venturi tube, and gage-tubes communicating in different directions with the flowing fluid for measuring the velocity of the fluid flowing through said shunt-throat, substantially as specified.

17. The combination in a fluid-meter, of a main tube of the Venturi type having a contracted throat, a shunt-tube located inside of said main tube and likewise having a contracted throat, and gage-tubes communicating in different directions with the flowing fluid for measuring the velocity of the fluid flowing through said shunt-throat, substantially as specified.

18. The combination in a fluid-meter, of a main tube of the Venturi type having a contracted throat, a shunt-tube located inside of said main tube, and also having a contracted throat, said shunt-tube delivering at the contracted throat of the Venturi tube, and gage-tubes communicating in different directions with the flowing fluid for measuring the velocity of the fluid flowing through said shunt-throat, substantially as specified.

19. The combination in a fluid-meter, of a main tube, with a shunt-tube having a contracted throat, and gage-tubes for measuring the velocity of the fluid flowing through said shunt-throat, one of said tubes communicating with the fluid at the shunt-throat, and the other with another portion of the flowing fluid, substantially as specified.

20. The combination in a fluid-meter, of a main tube, a shunt-tube located within said main tube and having a contracted throat, and gage-tubes for measuring the velocity of the fluid flowing through said shunt-throat, one of said tubes communicating with the fluid at the shunt-throat, and the other with another portion of the flowing fluid, substantially as specified.

21. The combination in a fluid-meter, of a main tube of the Venturi type having a contracted throat, a shunt-tube also having a contracted throat and disposed so as to deliver at the contracted throat of the Venturi tube, and gage-tubes for measuring the velocity of the fluid flowing through said shunt-throat, one of said tubes communicating with the fluid at the shunt-throat, and the other with another portion of the flowing fluid, substantially as specified.

22. The combination in a fluid-meter, of a main tube of the Venturi type having a contracted throat, a shunt-tube located inside of said main tube and likewise having a contracted throat, and gage-tubes for measuring the velocity of the fluid flowing through said shunt-throat, one of said tubes communicating with the fluid at the shunt-throat, and the other with another portion of the flowing fluid, substantially as specified.

23. The combination in a fluid-meter, of a main tube of the Venturi type having a contracted throat, a shunt-tube located inside of said main tube, and also having a contracted throat, said shunt-tube delivering at the contracted throat of the Venturi tube and gage-tubes for measuring the velocity of the fluid flowing through said shunt-throat, one of said tubes communicating with the fluid at the shunt-throat, and the other with another portion of the flowing fluid, substantially as specified.

In testimony whereof I have signed my name to this specification in the presence of two subscribing witnesses.

WALTER FERRIS.

Witnesses:
 F. E. BECHTOLD,
 JOS. H. KLEIN.